United States Patent [19]

Choi

[11] Patent Number: 4,867,513
[45] Date of Patent: Sep. 19, 1989

[54] PORTABLE CUPBOARD

[76] Inventor: Kwang S. Choi, Sangdo-4-Dong, Dongjak-ku, Seoul, Rep. of Korea

[21] Appl. No.: 109,369

[22] Filed: Oct. 19, 1987

[51] Int. Cl.$^4$ ............................................. A47B 43/00
[52] U.S. Cl. .................................... 312/258; 312/108; 312/198; 312/256
[58] Field of Search ............... 312/258, 205, 262, 256, 312/259, 257 R, 213, 255, 253, 243, 263, 264, 265, 107, 107.5, 108, 111, 198, 200, 201, 199

[56] References Cited

U.S. PATENT DOCUMENTS

| | | | |
|---|---|---|---|
| 963,769 | 7/1910 | Johnson et al. | 312/262 X |
| 963,853 | 7/1910 | Benson | 312/258 |
| 1,342,269 | 6/1920 | Stewart | 312/258 |
| 1,481,560 | 1/1924 | Ringer | 312/258 |
| 1,822,448 | 9/1931 | Morin | 312/258 |
| 2,934,389 | 4/1960 | Krey | 312/262 |
| 3,140,133 | 7/1964 | Kraft | 312/258 X |
| 3,570,418 | 3/1971 | Gooding | 312/265 X |
| 4,055,924 | 11/1977 | Beaver, Jr. | 297/442 X |
| 4,082,389 | 4/1978 | Stewart | 312/258 |

FOREIGN PATENT DOCUMENTS

| | | | |
|---|---|---|---|
| 13649 | 7/1980 | European Pat. Off. | 312/258 |
| 1195401 | 11/1959 | France | 312/256 |
| 162779 | 5/1921 | United Kingdom | 312/256 |
| 1043938 | 9/1966 | United Kingdom | 312/258 |

*Primary Examiner*—Peter A. Aschenbrenner
*Assistant Examiner*—Thomas A. Rendos
*Attorney, Agent, or Firm*—Fleit, Jacobson, Cohn, Price, Holman & Stern

[57] ABSTRACT

A portable cupboard formed as a collapsible container which is made from plate members hinged on their edges so that the whole container is collapsible, holding panels which enable the container to be kept solidly box-shaped and a pair of legs on top of which the container is supported.

3 Claims, 6 Drawing Sheets

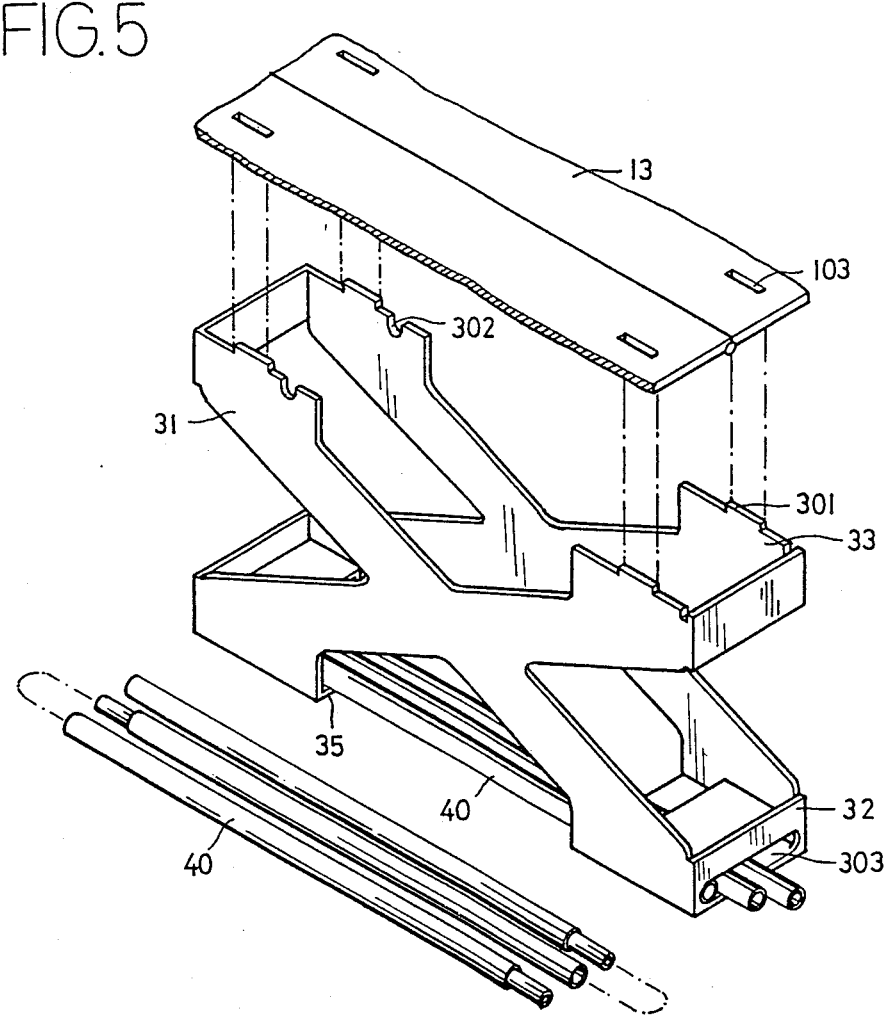

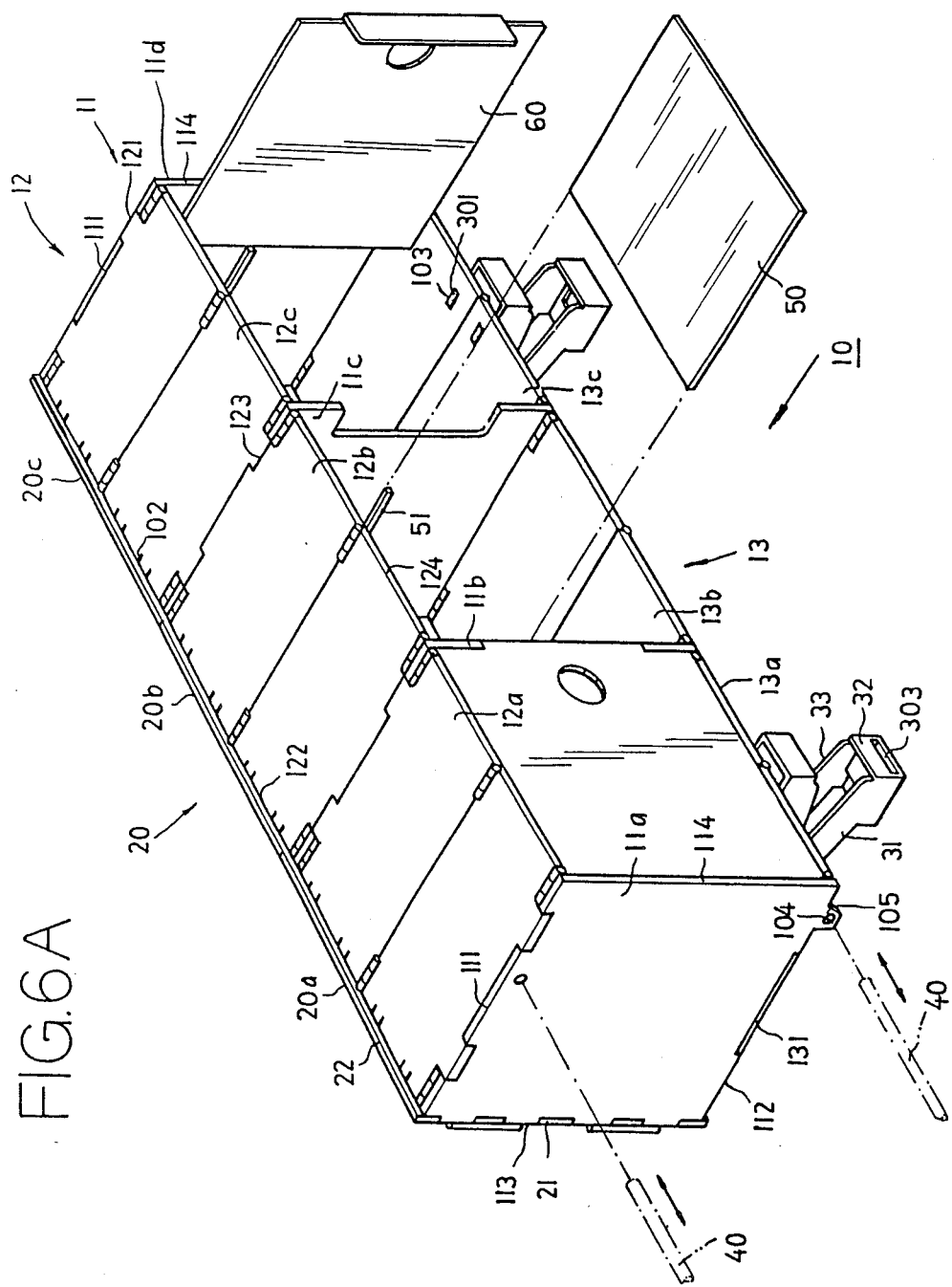

PORTABLE CUPBOARD

The present invention relates to a portable cupboard which can be readily assembled and packaged for the convenience of storage, and carrage.

In recent years, lots of people go to picnic or vacation with their own food, bowels and cookers so that they can cook and enjoy the food by themselves, in the picnic or vacation places. In this case, the problem is to keep the food, bowels and cookers well. Therefore it is appreciated that the cupboard, which can be compactly packaged for carrage and easily assembled when it is necessary, would be helpful to solve this kind of problem.

The primary object of the present invention is to provide a portable cupboard which is very easy to solidly assemble and to compactly package, even without the use of tools.

Another object of the present invention is to provide a portable cupboard which is supported on a pair of legs in order to prevent soil or the like on the ground from making unclean the food and the bowels therein.

Still another object of the present invention is to provide a portable cupboard of which a pair of legs can be used to the holder for the collapsed cupboard members in order to be more compactly packaged.

A further object of the present invention is to provide a portable cupboard of which the panel members are hinged mutually so that the whole container may be easily collapsed and assembled.

These and other objects of the present invention will become clear as the description of the present invention.

The present invention may be described with greater clarity and specificity be referring to the following figures:

FIG. 5 shows the engagement between collapsible container and leg member.

According to the present invention, a portable cupboard comprises a collapsible container, which consists of the plate members hinged on their edges for the whole container to be collapsible, holding panels which enable said container to be kept box-shaped solidly, and a pair of legs which make said container to be supported on their tops.

Figure 1:
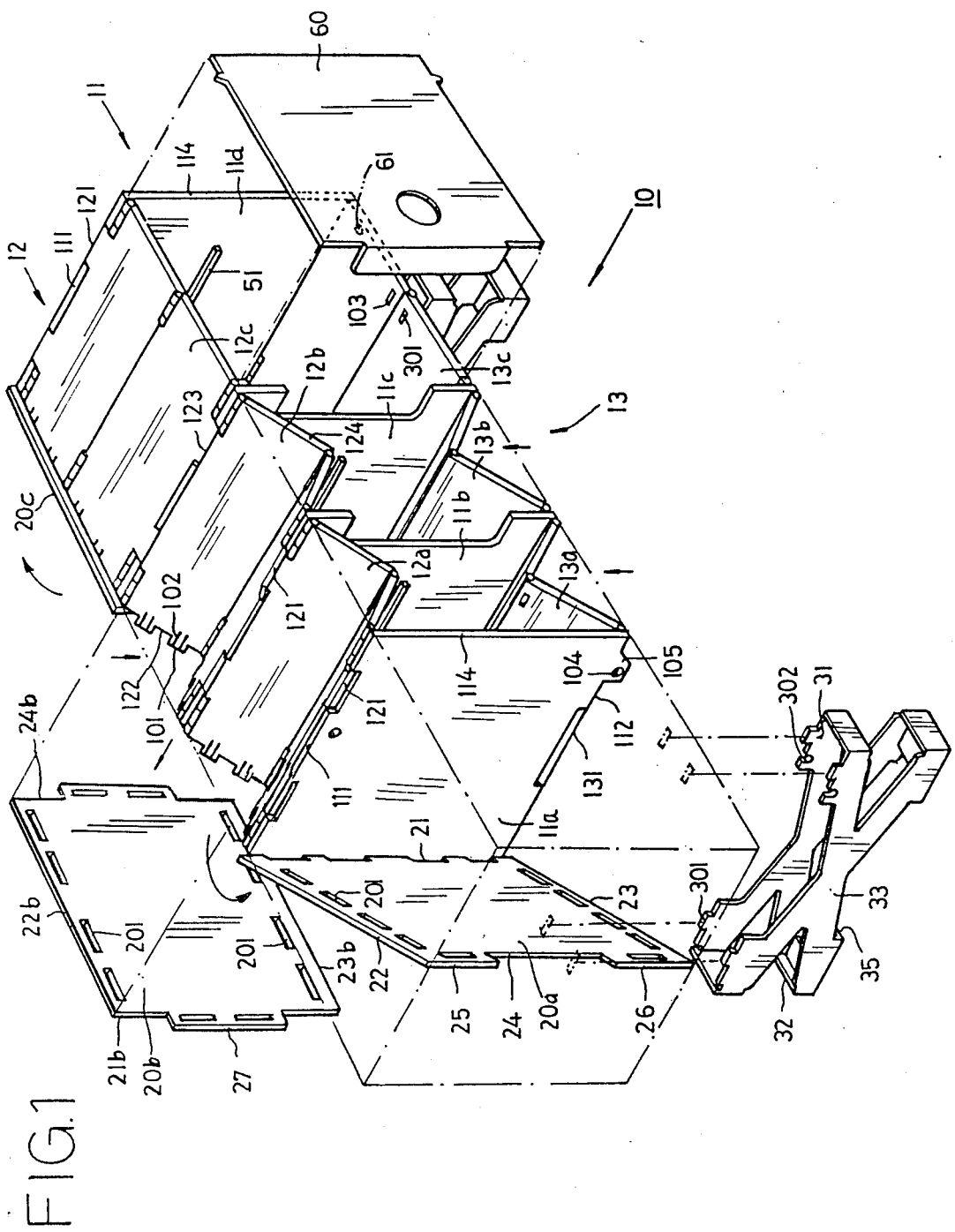
FIG. 1 shows the stage in the assembly of the cupboard.
Figure 2:
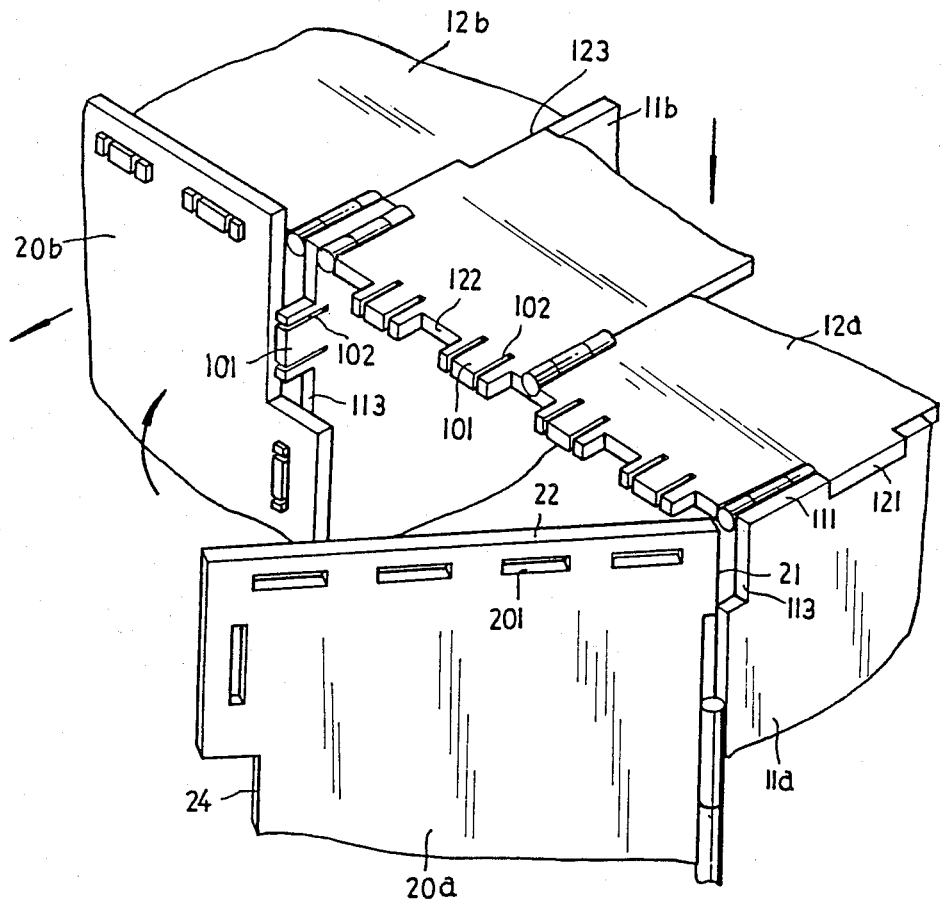
FIG. 2 shows the detail of the engagement between collapsible container and holding panel.
Figure 3:
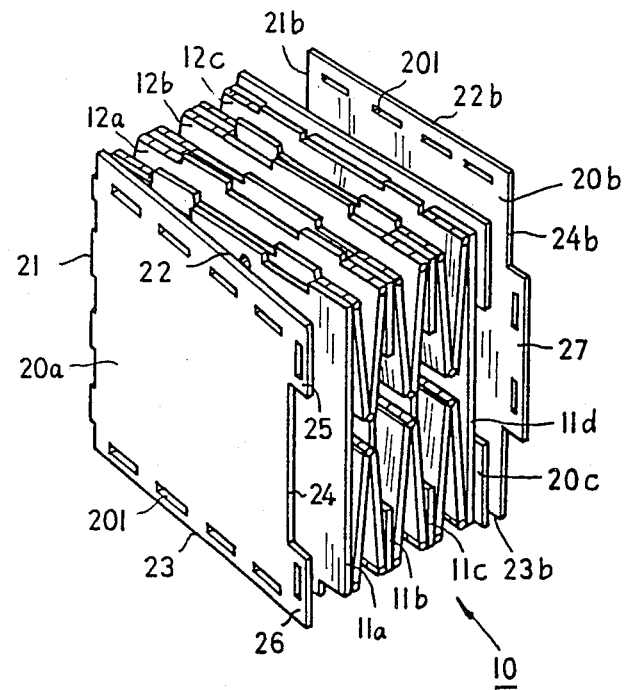
FIG. 3 shows the collapsed stage of the cupboard.

A collapsible container illustrated in FIGS. 1 to 3, which is indicated by reference numeral 10, is composed of the three boxes which are made of side panels 11, upper panels 12 and lower panels 13.

Side panels 11 are rectangular, and have four side edges, namely upper-edges 111, lower-edges 112, back-edges 113 and front-edges 114. the upper-edges 111 and the lower-edges 112 are hinged to the side edges 121, 131 of upper panel 12 and lower panel 13 respectively in order for the whole container to be collapsible. The lower edges 112 may have protrusion(s) 105 which is formed with hole(s) 104 in which supporting pole(s) can be engaged under the lower panel. The back edges 113 may have engaging protrusions 101 which are formed with slot(s) 102 which enable the side panel 11 to be engaged tightly to the engaging holes of holding panels.

In the preferred embodiment of the present invention, the first and the last side edges 113a, 113d are hinged to the holding panel 20 for the convenience of handling.

Upper panels 12, which consist of a pair of panels mutually hinged along their center edges for the whole container to be collapsible, are rectangular, and have four edges, namely, back edges 122, side edges 121, 123 and front edges 124. The back edges 121 are formed with engaging protrusions 101 formed with slot(s) 102 which enable the upper panel to be tightly engaged to the holding panel 20. Side edges 122, 123 are hinged to the upper edges 111 of the side panels 11.

It should be appreciated that lower panels 13 are of identical construction with said upper panels 12, except that they may have the supporting holes 103 in the appropriate spots where the tops of the legs are engaged.

Holding panels 20, which hold rigidly said collapsible container to be box-shaped, consist of the first panel 20a, the second panel 20b and the third panel 20c which are rectangular in the preferred embodiment of the present invention.

The first panel 20a has four edges, namely, the side edge 21a which is hinged to the back edge 113 of the first side panel 11a, the upper edges 22a and the lower edges 23a formed with the engaging holes 20 201 in the spots where the protrusions 101 of the upper and the lower panels are engaged, and the side edge 24 which have the upper convex 25, and the lower convex 26 formed with the engaging holes 201.

The second panel 20b is a separate panel which has four edges, namely, the upper edge 22b and the lower edge 23b which are formed with the engaging holes 201 in the places where the protrusions 101 of the upper and the lower panels 12, 13 are engaged, the side edges which have the center convex 27, fitted to the concaves formed between the upper and the lower convex 25 of the first and the third panels. Said center convex 26 are formed with the engaging holes 201 which are engaged to the protrusions 101 of the second and the third side panels 11b, 11c.

It will be appreciated that the third panel 20c is of identical construction with the first panel, except that it is hinged to the last side panel 11d.

Figure 4:
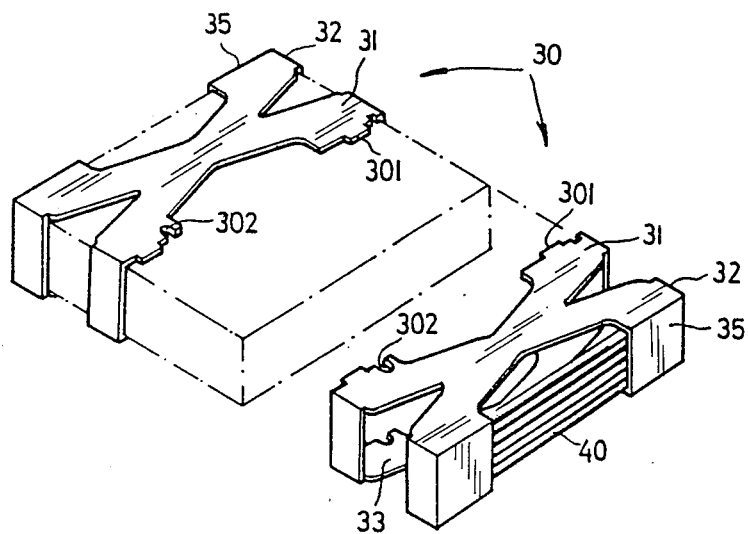
FIG. 4 shows the a pair of legs which receive the collapsed cupboard.

As can be readily seen from FIG. 4 in the preferred embodiment of the present invention a pair of legs 30 support the cupboard on the bottom in order to prevent soil or the like on the ground from making unclean the food or the bowls therein. The legs which are case-shaped so that the collapsed container put into through the opening formed at it top, consist of four side panels and one bottom panel.

Side panels 31, may have protrusions 301 at its top for engaging to the holes 103 formed at the lower panels 13 of the collapsible container, or have slots 302 at its top for supporting the poles which support the lower panel in order to keep the collapsible container to be box-shaped more rigidly, It will be appreciated that side panel 31 may have and other figure so long as it can support the container horizontally even though in this preferred embodiment it has cross-shaped figure.

Side panel 33 is of same construction with the side panel 31.

Side panel 32 may be formed with the hole 303 for receiving disassembled poles 40, above the bottom panel 35.

To make the collapsible container more rigid when use, supporting poles 40, which support the upper panels 12 and the lower 13 panels, may be engaged to the supporting holes 104 formed in the side panels 11. As can be readily seen from FIGS. 4 and 5, in the preferred embodiment of the present invention, the poles can be assembled to support the collapsible container, and disassembled to be put into the receiving holes 303 formed in said legs 30.

Figure 6B:
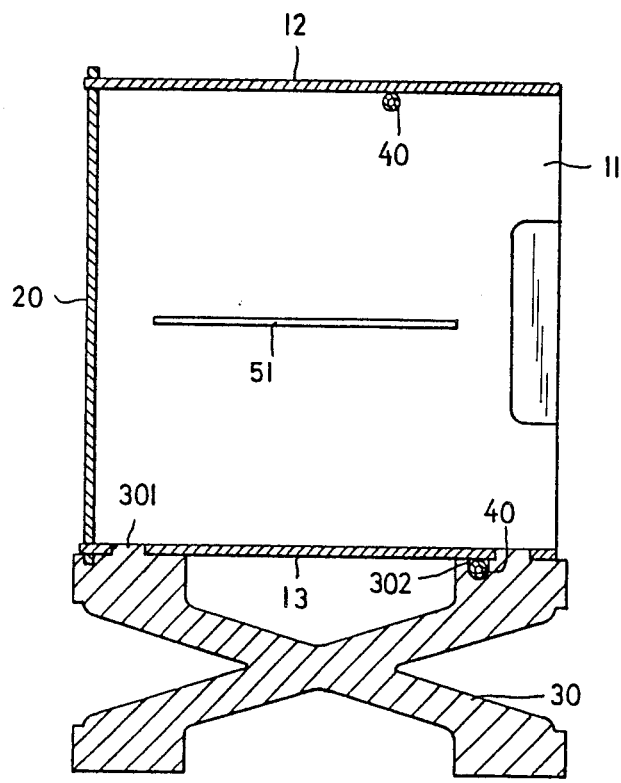
FIG. 6 shows the state of assembled cupboard.

As can be readily seen from FIG. 6, for the convenience of use, the shelve 50 may be supported on the supporters 51 fixed on inside plane of the side panels 11. In this case, it should be appreciated that the shelves 50 have such size as can be put into the boxes of the container 10 and are supported horizontally on the supporters 51.

FIGS. 1 and 6 also illustrate the use of the door member 60 for preventing the sand, the dust or the likes from making unclean the food or the bowls in the container, and it will be understood that the door members can be pivoted to the pivot-holes 61 (not shown) which are formed at the front corner of the upper and the lower panels 12, 13.

While the principles of the invention have now been made clear in an illustrative embodiment, there will be immediately obvious to those skilled in the art modification of structures, arrangement, proportions, the elements used in the practice of the invention which are particularly adapted for specific environment and operation requirements without departing from those principles.

I claim:

1. A portable cupboard, comprising:
    a collapsible container, which consists of side panels, upper panels and lower panels; holding panels; which are engaged to backedges of the panels of said container; and a pair of legs, which support said container on the bottom wherein said legs consist of four side panels and one bottom panel to constitute a case with an open top, in which the collapsed container can be put through the open top.

2. A cupboard as claimed in claim 1, wherein said side panels are formed with the engaging protrusions on the top edges which are engaged to the holes formed in the lower panel of the container.

3. A cupboard as claimed in claim 1, wherein said side panels are formed with the holes for receiving the disassembled supporting poles over said bottom panels.

* * * * *